United States Patent
Bonhote et al.

(10) Patent No.: US 7,467,461 B2
(45) Date of Patent: Dec. 23, 2008

(54) ADDITIVE GAP PROCESS TO DEFINE TRAILING AND SIDE SHIELD GAP FOR A PERPENDICULAR WRITE HEAD

(75) Inventors: Christian Rene Bonhote, San Jose, CA (US); Quang Le, San Jose, CA (US); Neil Leslie Robertson, Palo Alto, CA (US); Petrus Antonius Van Der Heijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 58 days.

(21) Appl. No.: 11/688,310

(22) Filed: Mar. 20, 2007

(65) Prior Publication Data
US 2008/0244896 A1 Oct. 9, 2008

(51) Int. Cl.
G11B 5/127 (2006.01)
H04R 31/00 (2006.01)

(52) U.S. Cl. ............. 29/603.16; 29/603.11; 29/603.13; 29/603.18; 29/605; 29/606; 360/121; 360/122; 360/317; 451/5; 451/41

(58) Field of Classification Search ............. 29/603.11, 29/603.13–603.16, 603.18, 605, 606; 360/121–123, 360/317
See application file for complete search history.

(56) References Cited

U.S. PATENT DOCUMENTS

| | | | |
|---|---|---|---|
| 7,002,778 B2 * | 2/2006 | Yazawa | 360/125.42 |
| 7,124,498 B2 * | 10/2006 | Sato | 29/603.13 |
| 2004/0161636 A1 | 8/2004 | Hujanen et al. | 428/692 |
| 2004/0184190 A1 | 9/2004 | Han et al. | 360/126 |
| 2005/0068665 A1 | 3/2005 | Le et al. | 360/97.01 |
| 2005/0068669 A1 | 3/2005 | Hsu et al. | 360/125 |
| 2005/0083605 A1 | 4/2005 | Hu et al. | 360/125 |
| 2005/0243463 A1 * | 11/2005 | Fontana et al. | 360/126 |
| 2005/0259355 A1 | 11/2005 | Gao et al. | 360/125 |

* cited by examiner

Primary Examiner—Paul D Kim
(74) Attorney, Agent, or Firm—Zilka-Kotab, PC

(57) ABSTRACT

A method of manufacturing a magnetic write head for perpendicular magnetic recording. The method includes the formation of a write pole over a substrate. A non-magnetic side gap layer is deposited and an ion milling is used to remove a portion of the substrate to lower the floor of the substrate. A sacrificial fill layer can then be deposited. A chemical mechanical polishing process can be used to remove the mask structure remaining as a remnant of the formation of the write pole, and then the sacrificial fill layer can be removed. A non-magnetic, electrically conductive material can be deposited to form a tailing gap, an a magnetic material can then be deposited to form a wrap around trailing shield.

23 Claims, 16 Drawing Sheets

ADDITIVE GAP PROCESS TO DEFINE TRAILING AND SIDE SHIELD GAP FOR A PERPENDICULAR WRITE HEAD

FIELD OF THE INVENTION

The present invention relates to perpendicular magnetic recording and more particularly to a method for manufacturing a perpendicular magnetic write head with a wrap around trailing magnetic shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bag bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layers induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer an a free layer. First and second leads are connected to the spin valve sensor for conducting a sensor current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetization of the pinned and free layers are parallel with respect to one another, scattering is minimal and when the magnetizations of the pinned and free layer are antiparallel, scattering is maximized. Changes in scattering alter the resistance of the spin valve sensor in proportion to cos Θ, where Θ is the angle between the magnetization of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Unintended magnetic field, such as from structures of the write head other than the write pole and even coming from the sides of the write pole itself can inadvertently write to portions of the medium that are outside of the intended track width.

Another feature of perpendicular magnetic systems is that the magnetism of the high coercivity magnetic medium can be difficult to quickly switch. It is desired that the system have a high field gradient at transitions so that the magnetic state of the medium can be quickly switched from one direction to another.

Therefore, there is a need for a magnetic write head for perpendicular recording that can effectively avoid stray magnetic fields from inadvertently writing to the magnetic medium. There is also a need for a write head structure that can increase magnetic field gradient, allowing fast switching of the magnetic medium from one magnetic state to another.

SUMMARY OF THE INVENTION

The present invention provides a method for manufacturing a magnetic write head for perpendicular magnetic recording, the write head having a magnetic trailing shield that wraps around the sides of the write pole. The method includes providing a substrate and then depositing a magnetic write pole material over the substrate. A mask structure is then formed over the write pole material, the mask structure including a hard mask (preferably diamond like carbon) formed directly over the write pole material. An ion milling process can then be used to form the write pole, and a non-magnetic side gap layer, such as alumina, is deposited. A second ion milling process is then performed sufficiently to remove portions of the substrate to form a lowered substrate floor. A sacrificial fill layer is then deposited and a chemical mechanical polishing process is performed to remove the remaining mask. The hard mask material acts as a CMP stop. The sacrificial fill layer and hard mask can then be removed, and an electrically conductive, non-magnetic material can be deposited to form a trailing gap and second side gap material. This second side gap material can be a non-magnetic material such as Rh or Ta, and the combined thicknesses of the gap thickness remaining first and second side gap layers define the trailing shield side gap thickness of the write head. A magnetic material can then be deposited or electroplated to form a wrap around trailing shield.

The present invention advantageously allows a chemical mechanical polishing process to be used to remove the remaining mask layer, which allows the write head to be constructed even at extremely small track widths. In addition, the lowered substrate floor provided by the method described above, allows the trailing shield to have a leading edge that extends beyond the leading edge of the write pole for improved magnetic shielding and improved write head performance and reliability.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments, presently contemplated contemplated for carrying out this invention. This description is made for the purpose of illustrating the general principles of this invention and is not meant to limit the inventive concepts claimed herein.

Figure 1:
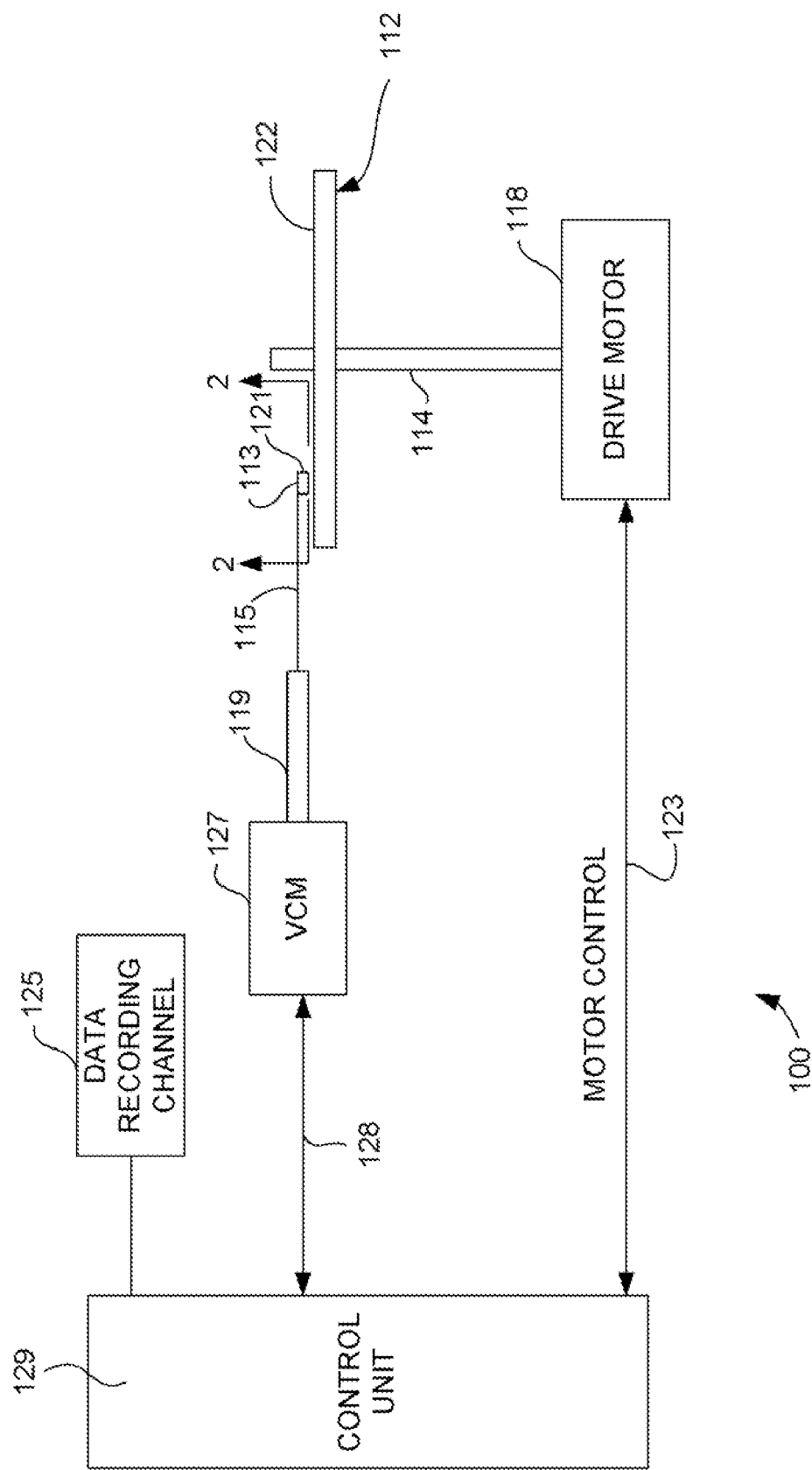
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recoridng on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operation such as drive motor control signals on line 123 and head position and seek control signals on line 128. The control signals on line 128 provides the desired current profiles to optimally move and position slider 113 to the desired data track on disk 112. Write and read signals are communicated to and from write and read heads 121 by way of recording channel 125.

Figure 2:
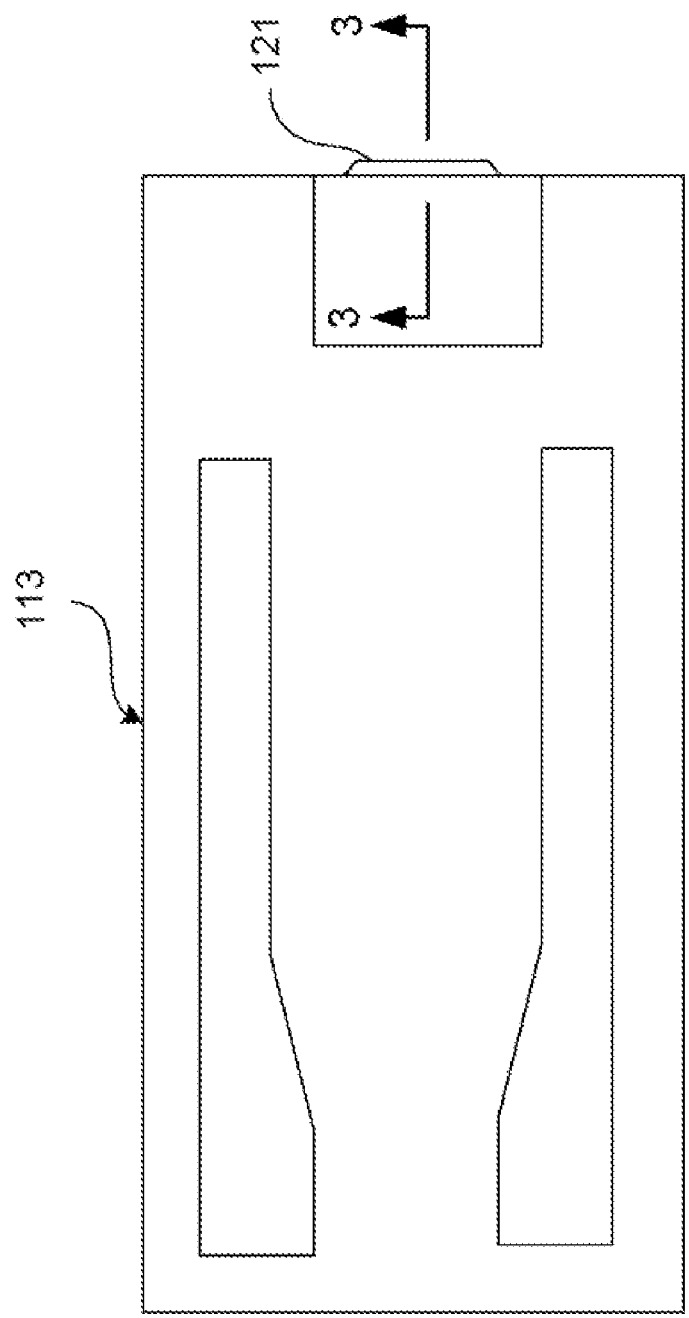
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detailed. FIG. 2 is an ABS view of the slider 113, and as can be seen, the magnetic head including an inductive write head and a read sensor is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
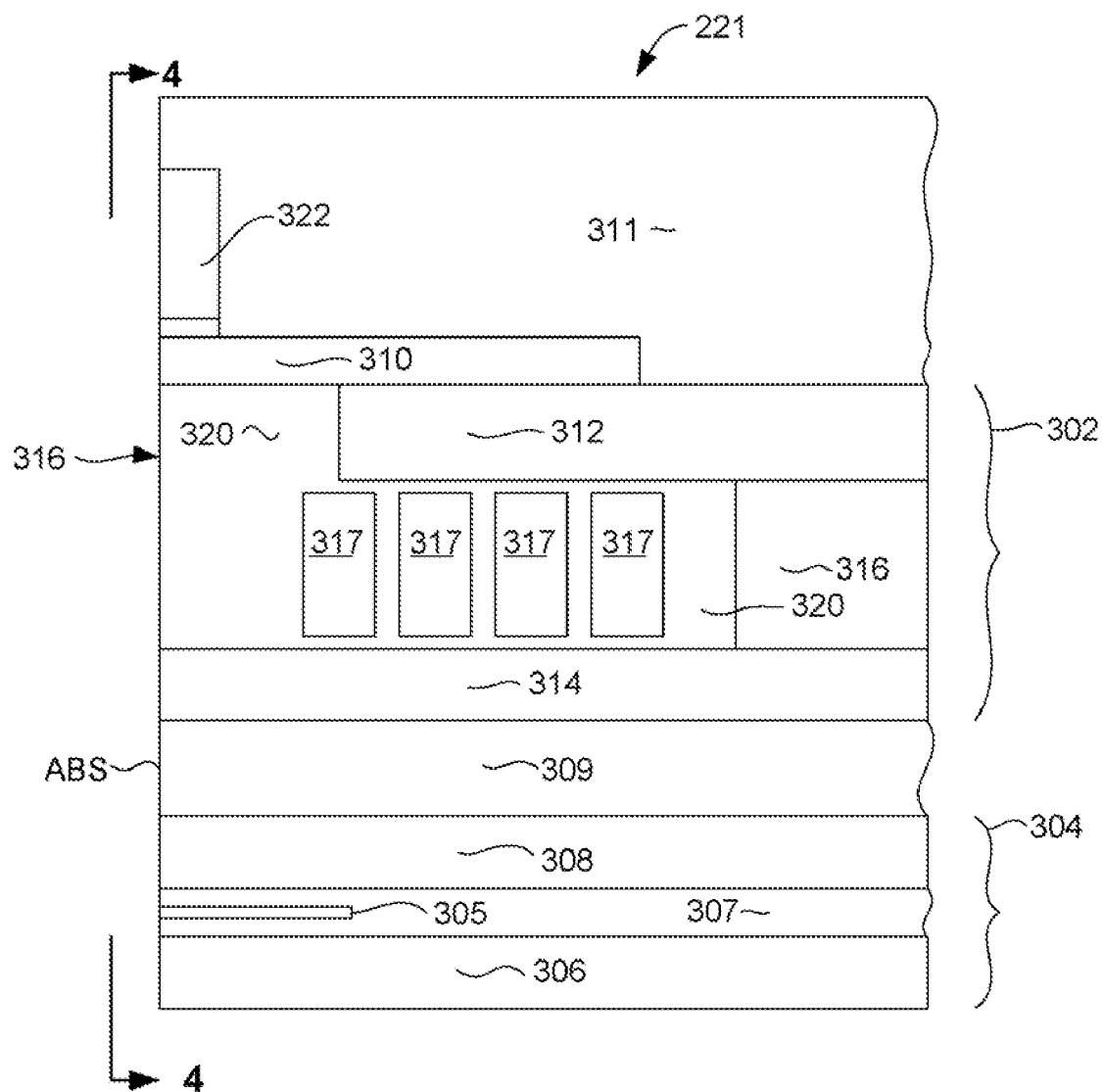
FIG. 3 is a cross sectional view view, taken from line 3-3 of FIG. 2 and rotated 90 degrees counterclockwise, of a magnetic head according to an embodiment of the present invention.

With reference to FIG. 3, a magnetic head 121 for use in a perpendicular magnetic recording system is disclosed. The head 121 includes a write element 302 and a read element 304. The read element includes a magnetoresistive sensor 305, such as a current in plane giant magnetoresistive (CIP GMR) sensor. However, the sensor 305 could be another type of sensor such as a current perpendicular to plane (CPP) GMR sensor or tunnel junction sensor (TMR) or some other type of sensor. The sensor 305 is located between and insulated from first and second magnetic shields 306, 308 and embedded in a dielectric material 307. The magnetic shields 306, 308, which can be constructed of for example CoFe or NiFe, absorb magnetic fields such as those from up-track or down track data signals, ensuring that the read sensor 304 only detects the desired data bit located between the shields 306, 308. A non-magnetic, electrically insulating gap layer 309 may be provided between the shield 308 and the write head 302.

Figure 4:
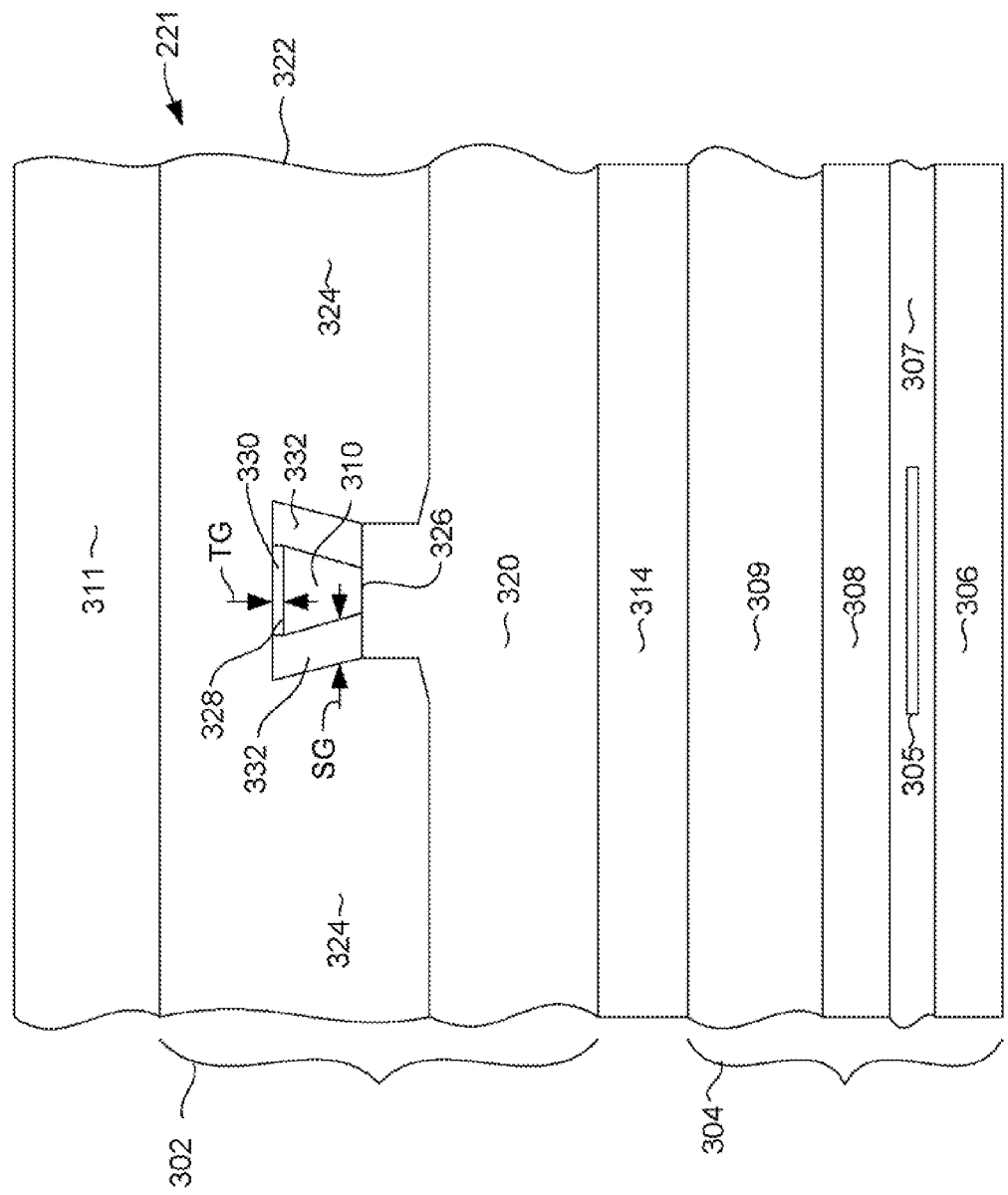
FIG. 4 is an ABS view of the write head taken from line 4-4 of FIG. 3.

With continued reference to FIG. 3, the write element 302 includes a write pole 310 that is magnetically connected with a magnetic shaping layer 312, and is embedded within an insulation material 311. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in a cross section in FIG. 3, passes through the write element 302 between the shaping layer 312, and the return pole 314. The write coil 317 is surrounded by an electrically insulating material 320 that electrically insulate the turns of the coil 317 from one another and electrically isolates the coil 317 from the surrounding magnetic structures 310, 312, 316, 314. When a current passes thorugh the coil 317, the resulting magnetic field causes a magnetic flux to flow thorugh the return pole 314, a back gap 316, shaping layer 312 and write pole 310. This magnetic flux causes a write field to be emitted toward an adjacent magnetic medium (not shown in FIGS. 3 and 4). The insulation layers 320 can be constructed of a material such as alumina ($Al_2O_3$) or can be constructed as various layers of the same or different electrically insulating, non-magnetic materials.

With reference to FIG. 4, the write head elements 302 may also include a trailing shield 322, which can be constructed of a magnetic material such as NiFe or some other material. With reference to FIG. 4, the trailing shield 322 is configured to wrap around the write pole 310 to provide side shielding as well as trailing shielding to prevent data erasure due to stray magnetic fields. These stray magnetic fields can be from the write head 302 itself or could also be from adjacent track signals or from magnetic fields from external sources. The write pole 310 has a leading edge 326 and a trailing edge 328. The terms leading and trailing refer to the direction of travel over the magnetic medium when the write head 221 is in use.

Therefore, the trailing shield 322 has side portions 324. These side portions each have a leading edge 330 that extends at least to the leading edge 326 to the write pole 310 and which preferably extend beyond the leading edge 326 of the write pole 310. Extending the side portions 324 to or beyond the leading edge of the write pole, ensures that any side stray fields will be very effectively prevented from affecting the magnetic medium.

As can be seen, the trailing shield 322 is separated from the trailing edge 328 of the write pole 310 by a non-magnetic trailing gap layer 330 having a trailing gap thickness (TG), and is separated from the laterally opposed sides of the write pole by non-magnetic side gap layers 332 each having a side gap thickness (SG). The portion of the trailing shield 322 that is adjacent to the trailing edge 328 of the write pole 310 increase the field gradient of the write bead. This is accomplished by drawing the write field toward this trailing portion of the trailing shield 322, which cants the write field a desired amount. Therefore, the write field is not perfectly perpendicular, but is canted somewhat in the trailing direction.

The trailing gap thickness TG involves a tradeoff. If the trailing gap TG is too large, field gradient will not be large enough. If the trailing shield gap TG is too small, an unacceptable amount of write field will be lost to the trailing shield, resulting in a weak write field. Therefore, the thickness of the trailing gap TG should be somewhat tightly controlled. The thickness of the side gaps SG is, however, not as critical. The side gaps SG are preferably larger than the trailing gap TG.

With reference still to FIG. 4, the write pole 310 preferably has a trapezoidal shape as viewed from the ABS. This trapezoidal shape, wherein the write pole 310 is narrower at the leading edge 326 than at the trailing edge prevents skew related adjacent track interference when the write head is located at inner and outer portions of magnetic disk (FIG. 1).

Although the invention is shown embodied in a write head 302 having a floating trailing, wrap around shield 322, this is for purposes of illustration only. The invention could just as easily be embodied in a write head 302 having an upper return pole (not shown) that could magnetically connect the trailing, wrap around shield 322 with the back 316 and/or shaping layer 312. In addition, such a head could also include an upper set of write coils (also not shown) that could connect with the lower coils 317 to form a helical coil or could form a separate pancake coil.

With reference to FIGS. 5-15, a method for constructing a write head for perpendicular magnetic recording is described. The method allows the trailing shield to be formed so that it can extend to or beyond the leading edge of the write pole, thereby ensuring complete protection against side stray field writing.

Figure 5:
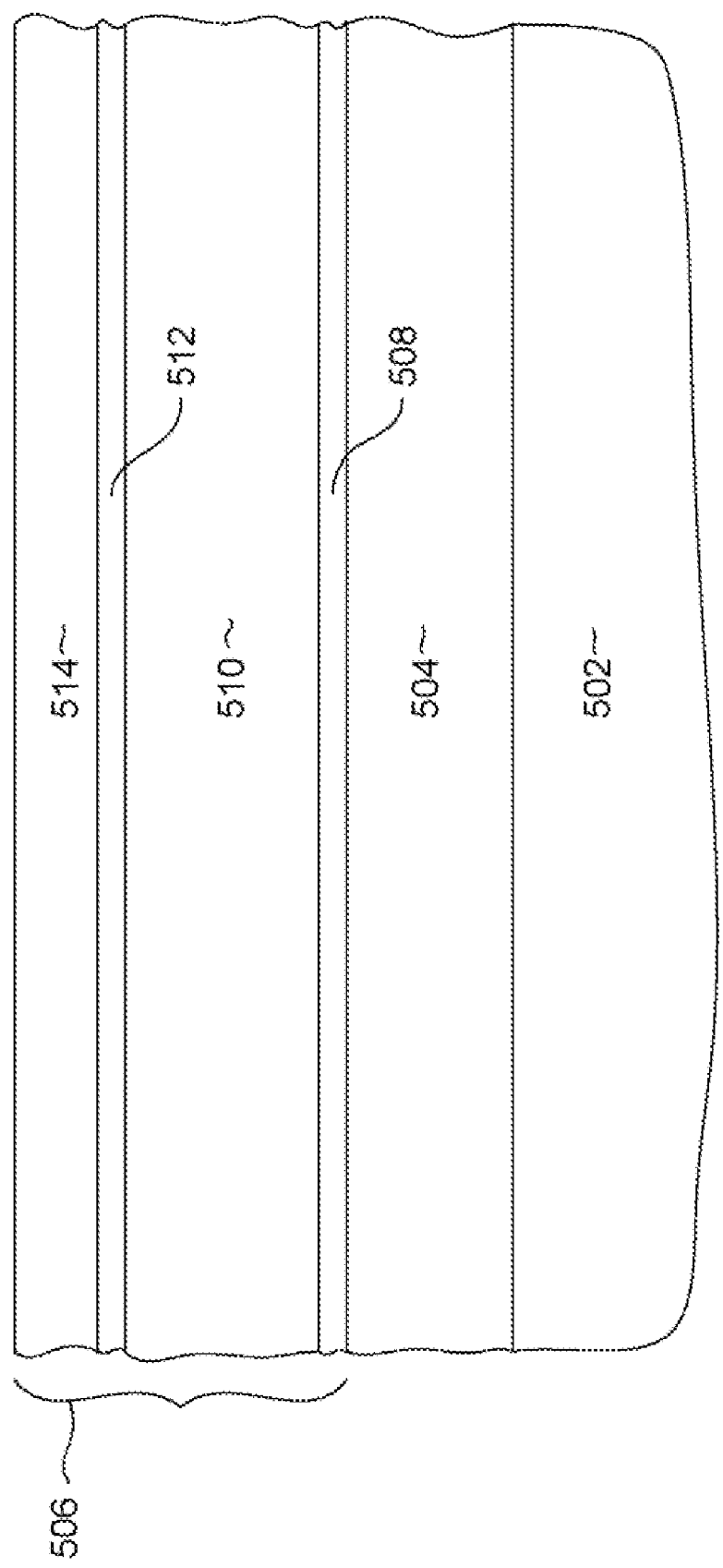
FIGS. 5-15 are views of a write head in various intermediate stages of manufacture illustrating a method of manufacturing a write head according to a possible embodiment of the invention.

With particular reference to FIG. 5, a substrate 502 is provided. This substrate 502 can be constructed of alumina ($Al_2O_3$). The substrate 502 can be formed with the shaping layer 312 (FIG. 3) (deposited or electroplated during a shaping layer fill process and planarized by chemical mechanical polishing (CMP) to expose the top surface of the magnetic shaping layer 312).

A magnetic write pole material 504 is deposited over the sustrate 502. While various magnetic materials can be used for the write pole material 504, such as NiFe, CoFe, etc., the write pole material 504 is preferably deposited as a lamination of magnetic layers such as NiFe or CoFe separated by thin layers of non-magnetic material such as alumina ($Al_2O_3$) or some other non-magnetic material.

A series of one more mask layers 506 are deposited over the magnetic write pole material 504. The mask 505 may be one of many possible structures, but preferably includes a first or bottom hard mask 508, an image transfer layer 510, a second hard mask layer 512, and a resist layer 514 such as photoresist or thermal image resist. The first hard mask layer 508 is preferably constructed of a material that is resistant to CMP and also to ion milling. The first hard mask layer is, therefore, preferably constructed of diamond like carbon (DLC). The image transfer layer 510 can be constructed of a soluble polyimide material such as DURAMIDE®. The second image transfer layer 512 can be constructed to a material such as $SiO_2$.

Figure 6:
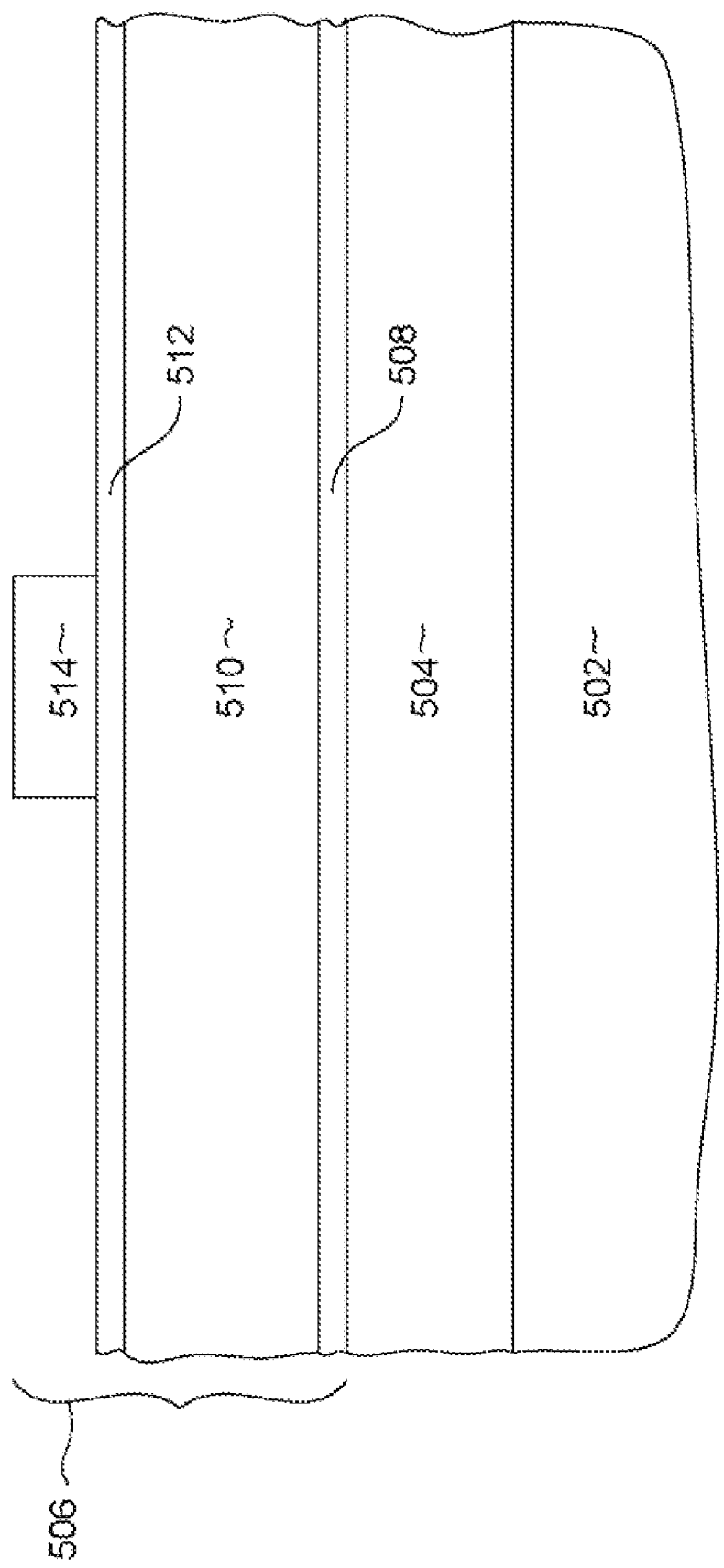
Figure 7:
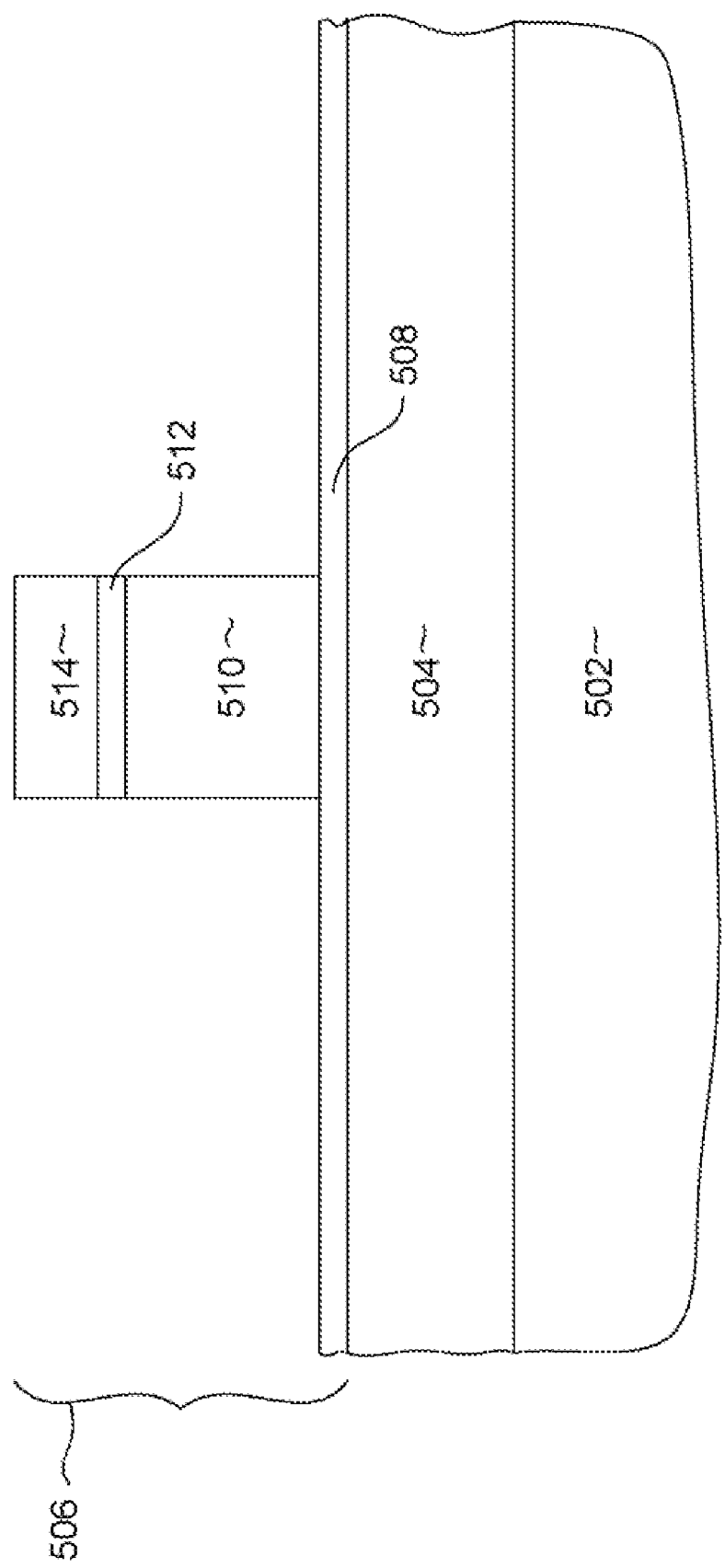

With reference now to FIG. 6, the resist layer is patterned to have a width to define a track width of the write pole 310 (FIG. 4) The resist layer 514 can be patterned by photolithographic processes that may include photolithographic imaging and developing. Then, with reference to 7 one or more material removal processes such as reactive ion etching (RIE) can be performed to transfer the pattern of the resist layer 514 onto the underlying image transfer layer 510 and hard mask 512.

Figure 8:
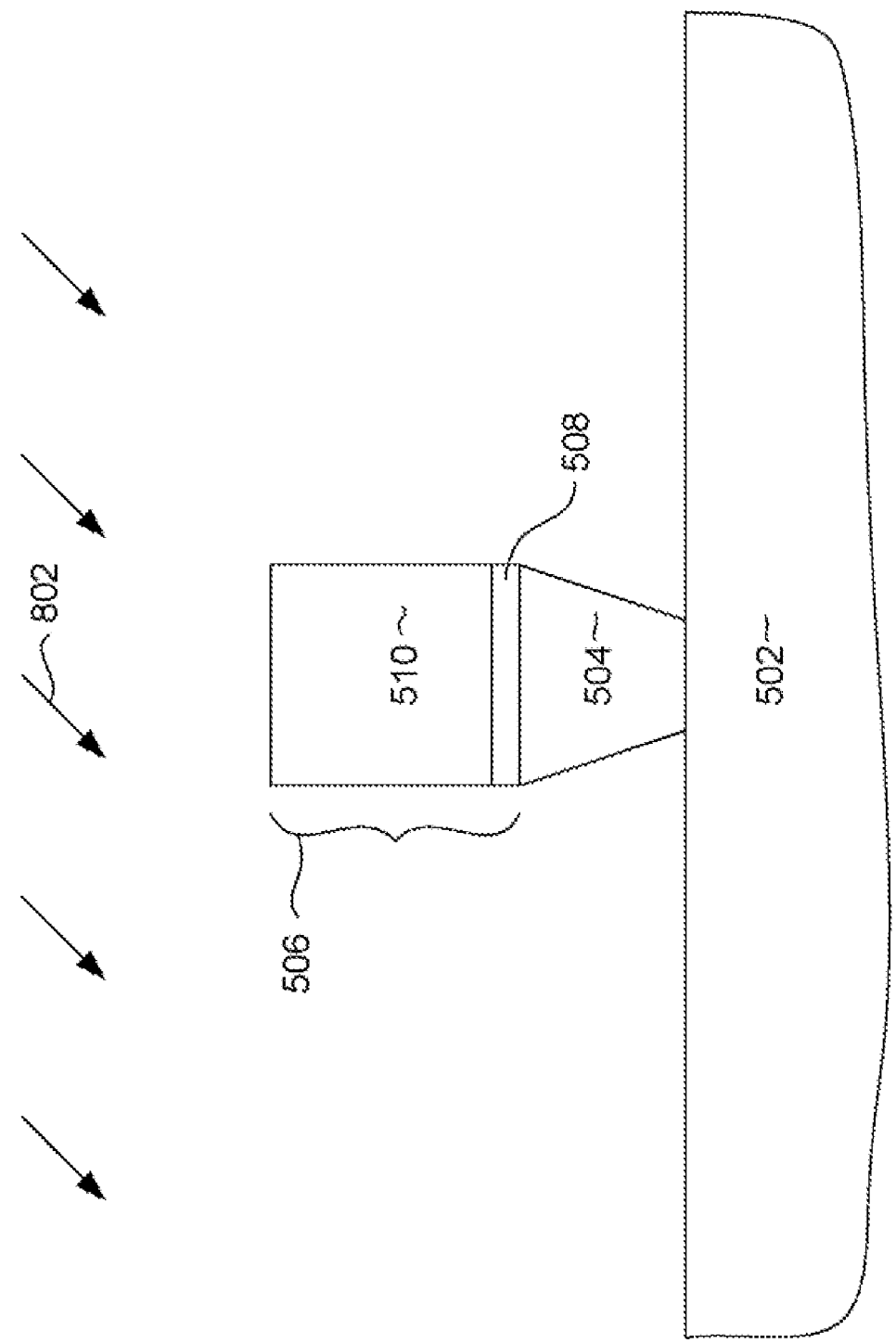

Then, with reference to FIG. 8, an ion milling process is performed to remove portions of the write pole material 504 that are not protected by the mask 506. It can be seen that the ion milling also remove portions of the first hard mask 508 that are not covered by the image transfer layer. The first hard mask is resistant to ion milling and, therefore, allows the write pole 504 to be formed with a well controlled width (trailing edge). The ion milling can be peformed by directing an ion beam 802 at one or more angles relative to normal in order to form the write pole 504 with a trapezoidal shape as shown. The ion milling can be performed until the underlying substrate 502 has been reached.

Figure 9:
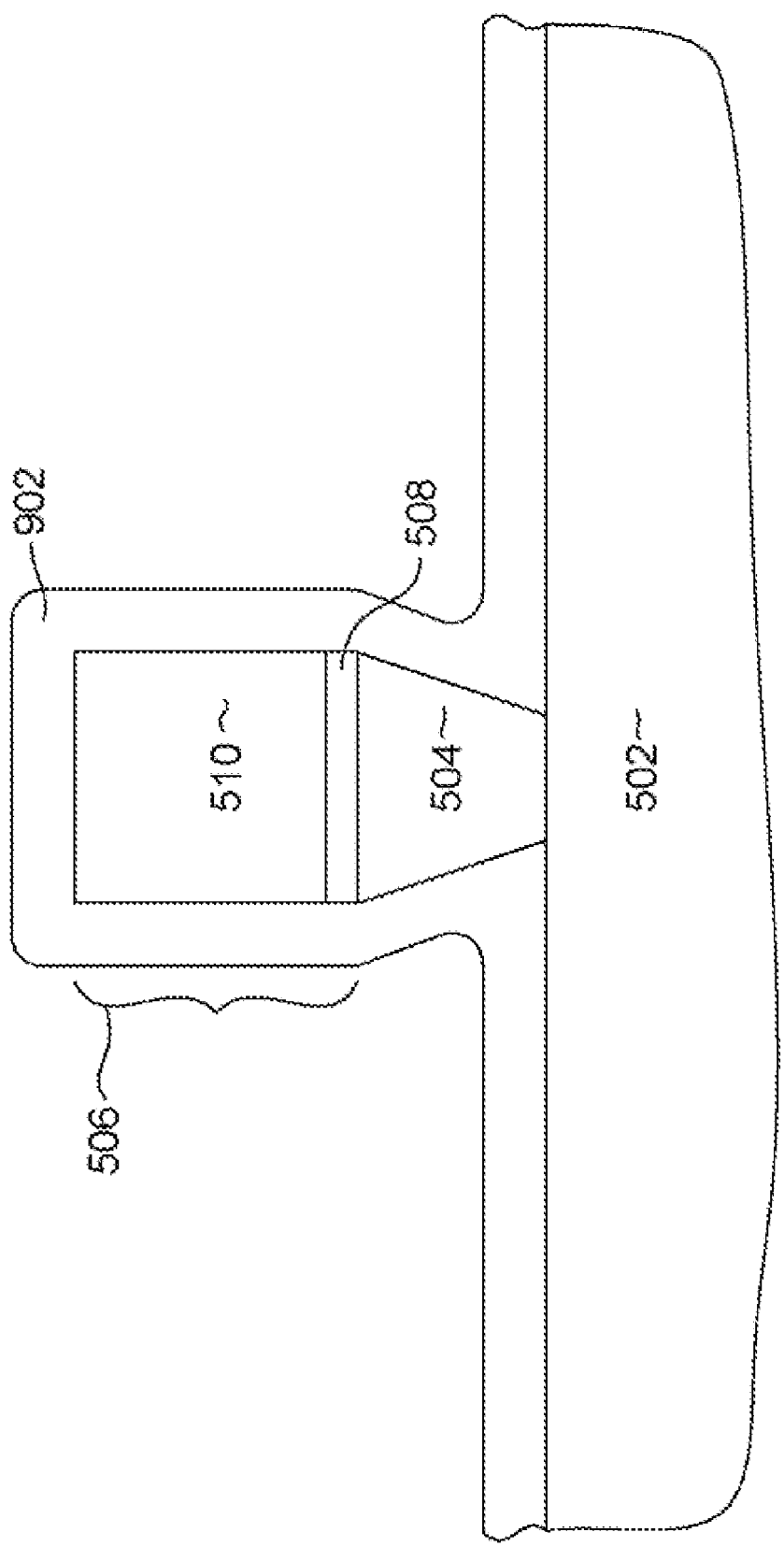
Figure 10:
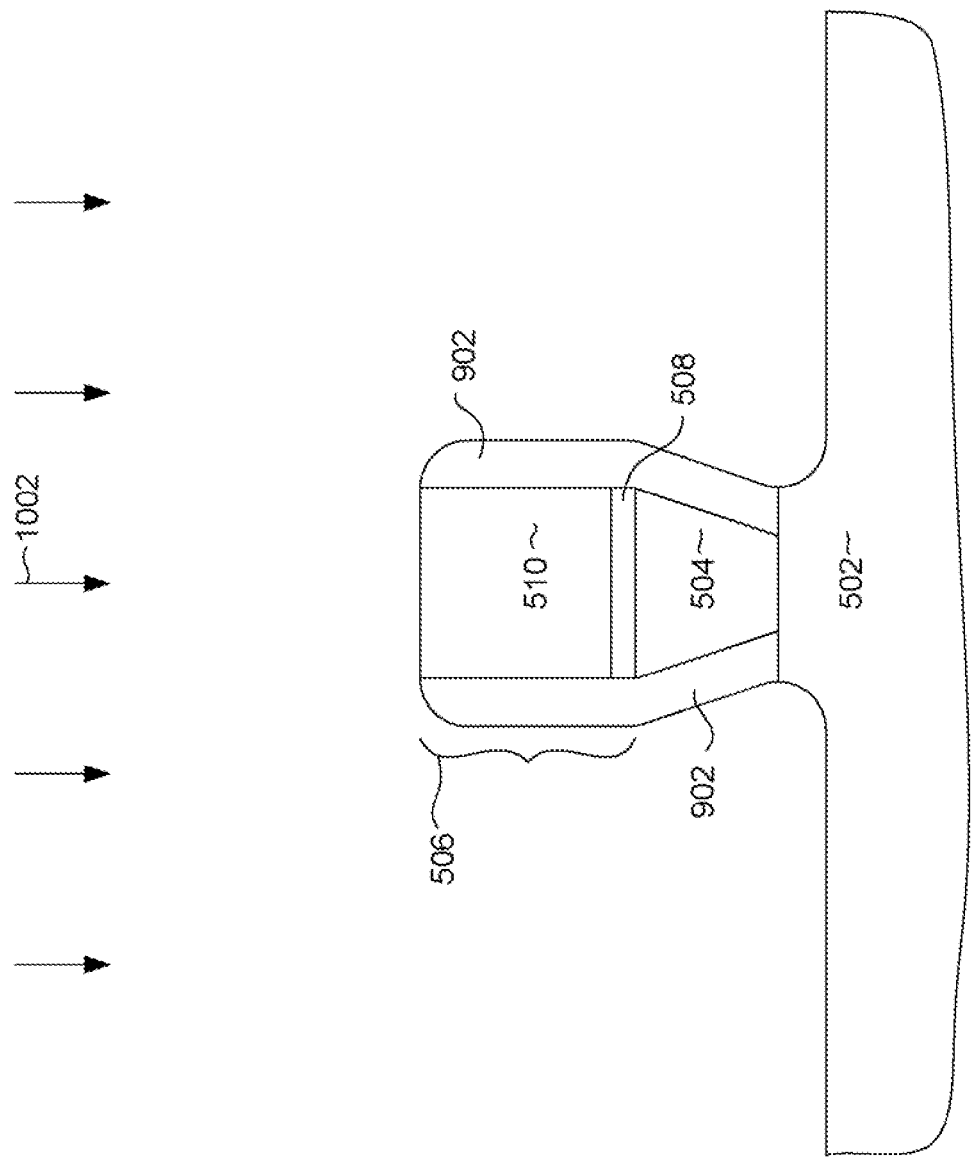

With reference to FIG. 9, a layer of non-magnetic side wall material (first non-magnetic side wall layer) 902 is conformally deposited. The side wall material 902 is preferably alumina, deposited by a conformal deposition process such as atomic layer deposition (ALD) or some other conformal process such as chemical vapor deposition (CVD). Therefore, the layer 902 will be referred to herein as ALD layer 902. With reference to FIG. 10, an ion milling process is performed, directing an ion beam 1002 at the ALD layer 902. Because ion milling is a direction process, it removes the horizontally disposed portions of the ALD layer 902 more quickly than the vertical portions. Therefore, the ion milling results in ALD side walls 902 formed at the sides of the write pole 504. The ion milling is continued after the substrate 502 has been reached in order form a recessed floor 1004 on the substrate. The term "recessed floor", means that the portions of substrate 502 at either side of the write pole 54 are recessed, while the portion of the substrate 502 beneath the write pole 504 forms a raised platform. The presence of the ALD side walls 902 protect the write pole 504 during this additional ion milling step.

Figure 11:
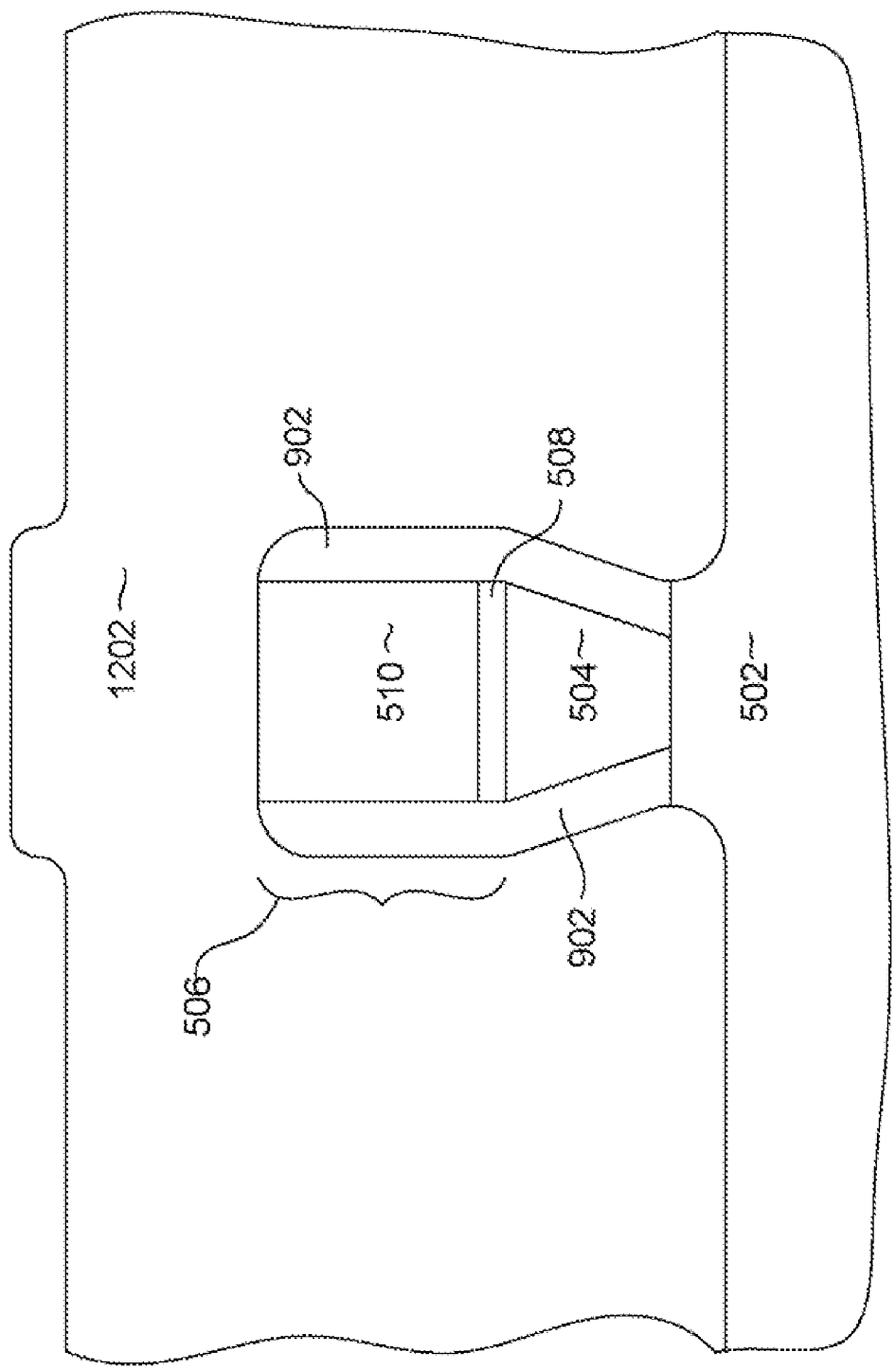

With reference now to FIG. 11, a sacrificial CMP fill layer 1202 is deposited. The sacrificial fill layer 1202 is constructed of a material that can be easily removed by a process such as wet etching or reactive ion etching (RIE). For example, the fill layer can be $SiO_2$ or SiON. The fill layer 1202 is also preferably deposited to a thickness such that the surface of the fill layer 1202 is above the write pole 504, and remaining mask material 506.

Figure 12:
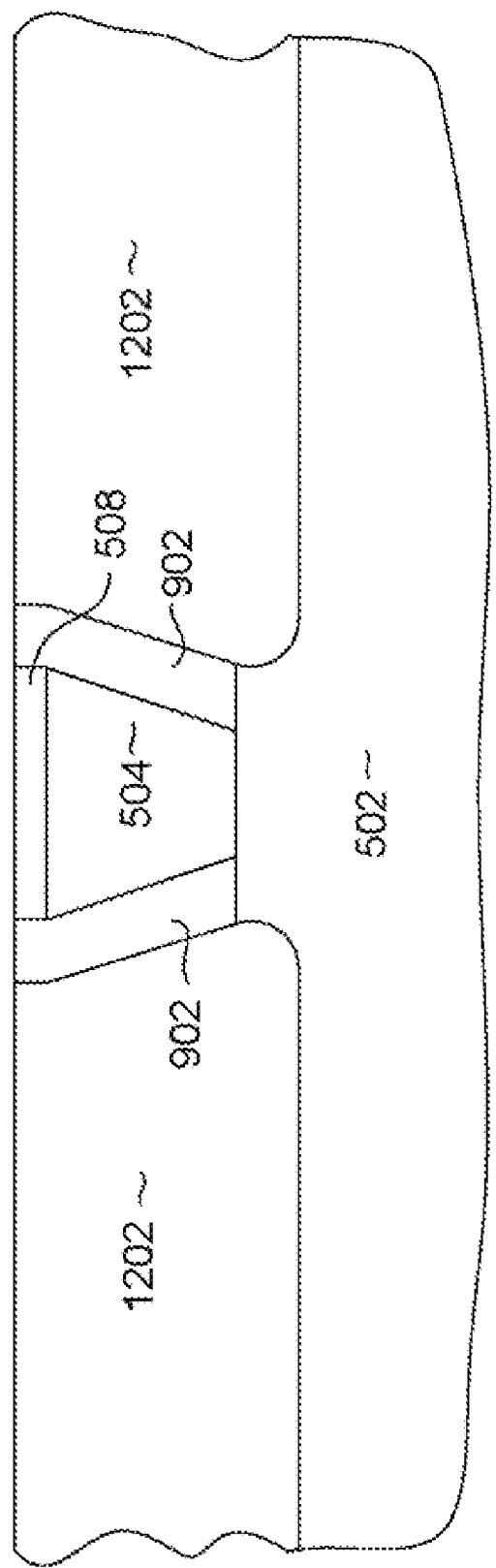
Figure 13:
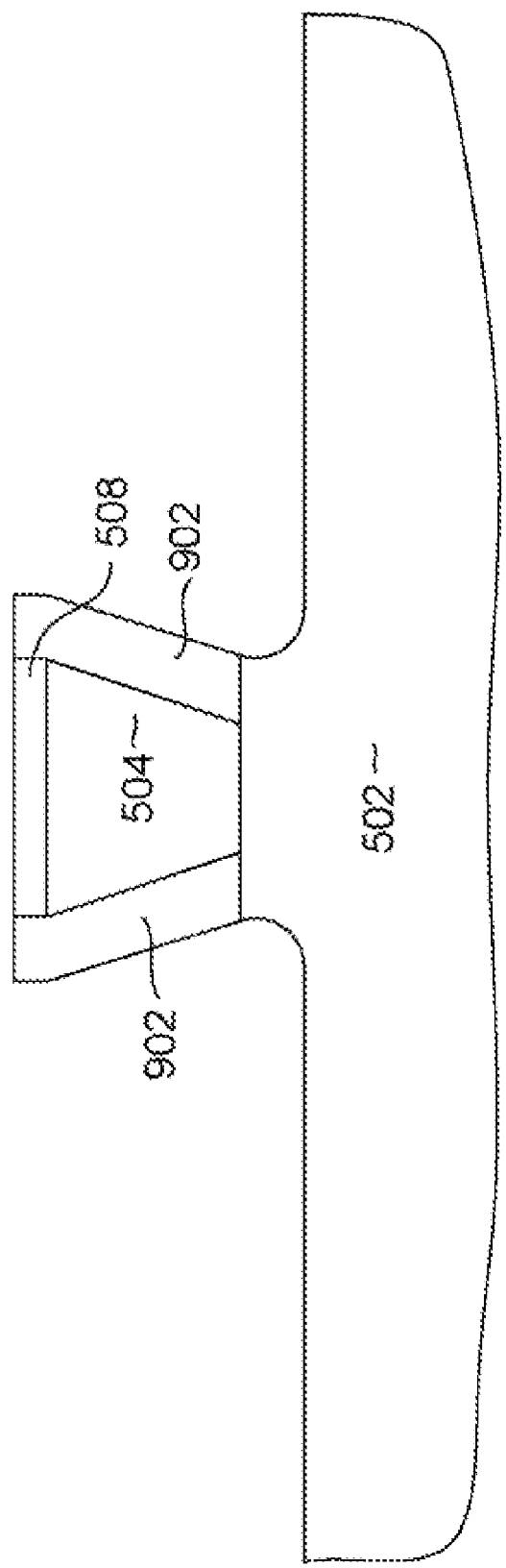

With reference now to FIG. 12, a chemical mechanical polishing (CMP) process is performed until the first hard mask layer 508 is reached. As mentioned above, the first hard mask can be constructed of DLC, which is advantageously very resistant to chemical mechanical polishing (CMP) and is also readily identifiable as a CMP stop, giving a clear visual indication of when CMP should be terminated. The CMP process removes the remaining mask structure 564, leaving only the hard mask portion 508 behind. Then, the sacrificial fill layer 1202 can be removed, leaving a structure as shown in FIG. 13. The sacrificial fill layer 1202 can be removed by a process such as wet etching or reactive ion etching (RIE). For example, if RIE is used to remove the sacrificial fill layer 1202, the RIE can be performed in a fluorine chemistry such as in a $CF_4$ atmosphere. During the removal of the fill layer 1202, the hard mask 508 (preferably DLC) protects the write pole 504 form being damaged by the fluorine based RIE.

Figure 14:
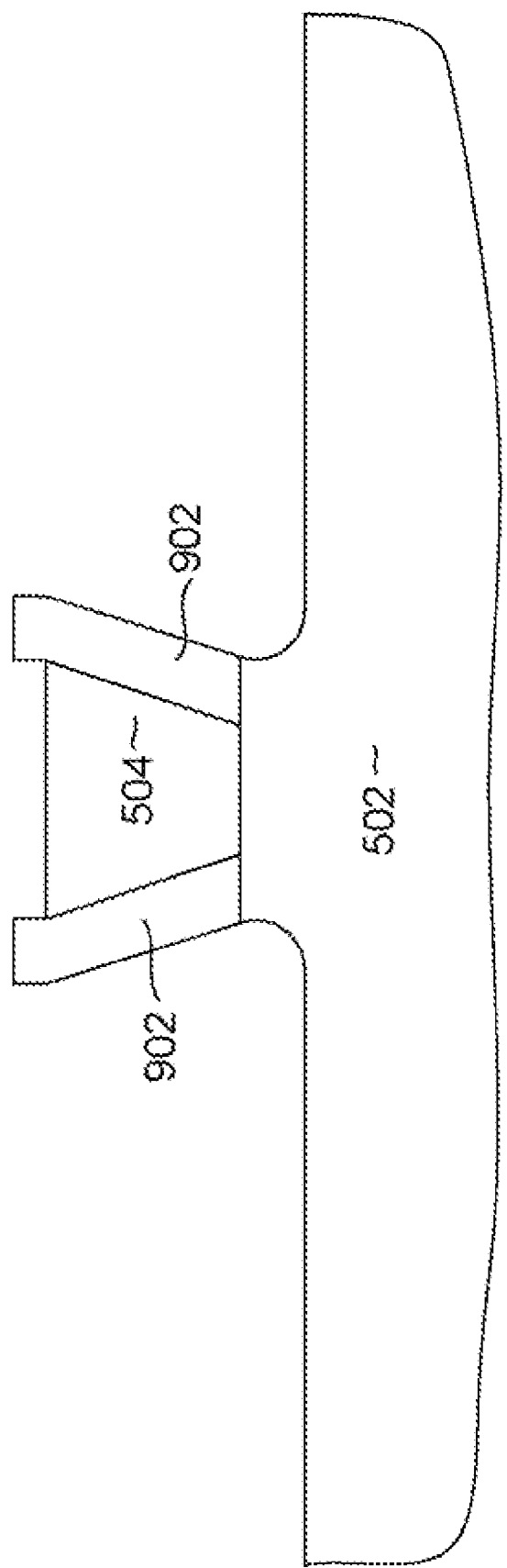

After the fill layer 1202 has been removed, a second RIE can be performed to remove the hard mask 508, resulting in the structure shown in FIG. 14. This second RIE can be performed in an oxygen chemistry such as in an $O_2$ atmosphere. The use of oxygen in this second RIE readily removes the DLC Hark mask 508 without damaging the underlying write pole 504.

Figure 15:
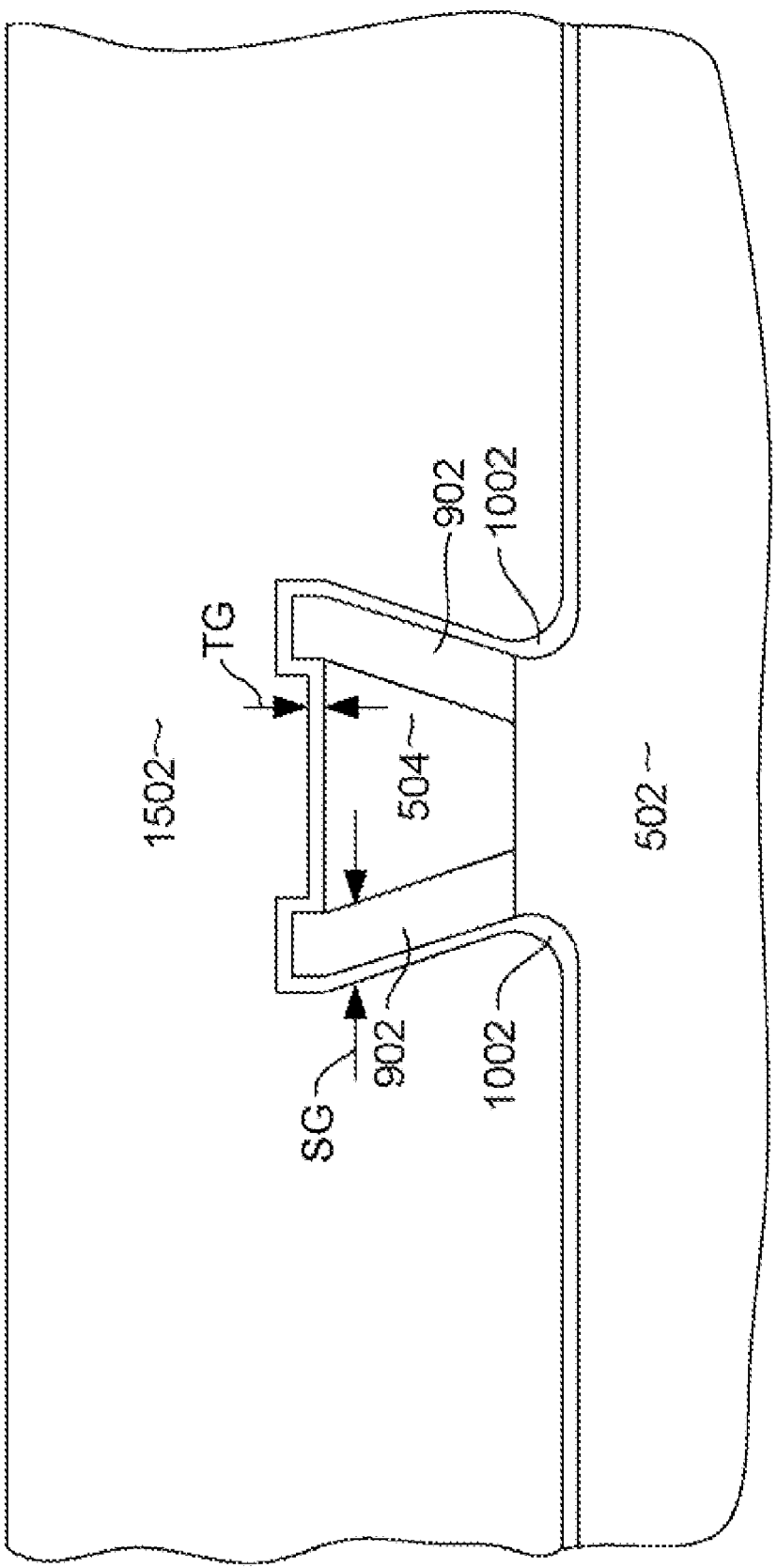

Then, after the hard mask 508 has been removed, a non-magnetically (preferably electrically conductive) material 1002 can be deposited, resulting in a structure as shown on FIG. 15. This non-magnetic, electrically conductive material can be, for example, Rh, Ir or Ta, and is deposited to such a thickness as to define a trailing gap thickness (TG). Note that the combined thickness of the non-magnetic layer 902 plus the non-magnetic layer 1002 define a side gap thickness SG.

Finally, with continued reference to FIG. 15, a magnetic material 1502 such as NiFe or CoFe can be deposited by electroplating in order to form a wrap around trailing magnetic shield 1502. The shield 1502 advantageously extends below the bottom of the write pole, because of the recession of the floor of the substrate as described above. As mentioned above, the electrically conductive, non-magnetic layer 1002 combines with the ALD layer 902 to define the side gap width SG, whereas the thickness of 1002 defines the trailing gap thickness TG. In addition, because the non-magnetic layer 1002 is an electrically conductive metal such as Ta and Ir or Rh, it can be used as a seed layer to assist plating.

Figure 16:
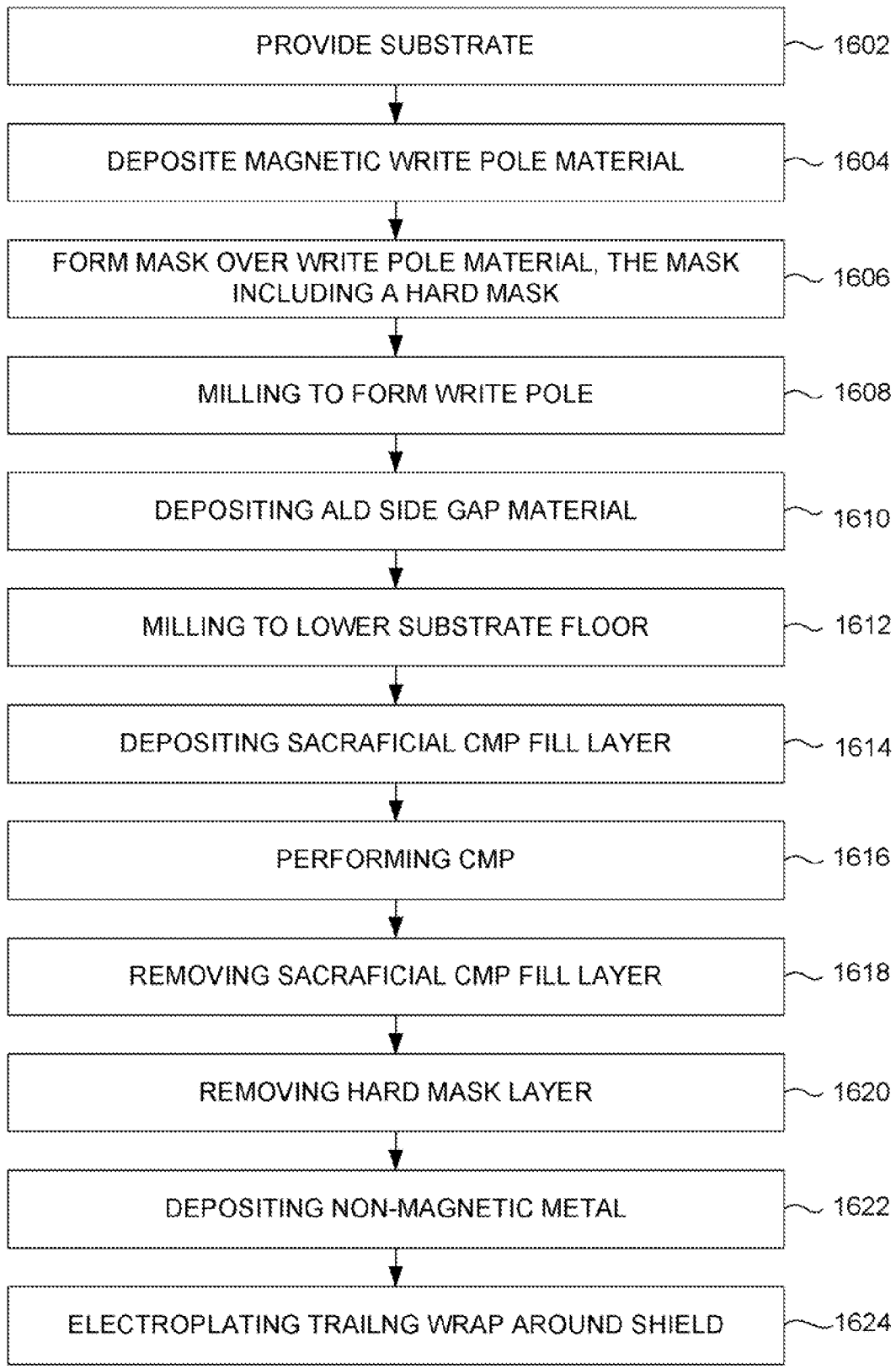
FIG. 16 is a flow chart illustrating a method for manufacturing a magnetic write head.

With reference now to FIG. 16, a method 1600 for manufacturing a magnetic write pole and wrap around shield is summarized. In a step 1602, a substrate is provided. As mentioned before, the substrate can be constructed primarily of alumina, and can include a magnetic shaping layer or some other magnetic structure embedded therein. Then, in a step 1604, a magnetic write pole material can be deposited over the substrate. The magnetic write pole material can be a lamination of magnetic layers separated by thin, non-magnetic layers. Then, in a step 1606, a mask structure is formed over the write pole. The mask structure includes a hard mask formed over the write pole material, the hard mask being a material such as diamond like carbon (DLC) that is resistant to chemical mechanical polishing (CMP). Then, in step 1608, an ion milling process is used to form the write pole. In a step 1610, a side gap material (ALD layer) is deposited, which is preferably conformally deposited alumina. Then, in step 1612 an ion milling process is used to remove horizontally disposed portions of the side gap layer, thereby forming alumina side walls, and is further performed to remove portions of the substrate that are not protected by the write pole and ALD side walls, thereby lowering the substrate floor. It should be pointed out also, that the order of steps 1610 and 1612 could be reversed so that the second ion milling lowers the substrate floor before the non-magnetic side gap material is deposited.

A sacrificial fill layer is then deposited in a step 1614. The sacrificial fill layer can be a material such as $SiO_2$ or SiON that can be readily removed without damaging other structures. Then, in a step 1616 a chemical mechanical polishing process is performed to remove the remaining mask structure except for the hand mask, which is used as a CMP stop layer. In a step 1618 the sacrificial fill layer is removed by a process such as wet etching or reactive ion etching (RIE). In a step, 1620, the hard mark is removed, such as by a RIE performed in an oxygen atmosphere. Then, in step 1622 a non-magnetic metal is deposited. The non-magnetic metal, such as Ta, Ir or Rh is deposited to a thickness to define the trailing gap and to such a thickness that the combined thicknesses of the ALD walls and the non-magnetic metal together define the side gap. Then, in a step 1624, a magnetic material, such as NiFe is deposited to form a wrap around trailing shield, using the non-magnetic metal as an electrically conductive seed for electroplating.

While various embodiments have been described, it should be understood that they have been presented by way of example only, and non limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic recording, comprising:
   providing a substrate;
   depositing a magnetic write pole material over the substrate;
   forming a mask structure over the magnetic write pool material, the mask structure including a hard mask layer comprising a material that is resistant to chemical mechanical polishing formed over the magnetic write pole material;

performing a first ion milling to define a write pole;

depositing a non-magnetic side gap layer;

performing a second ion milling sufficiently to remove a portion of the substrate material resulting in a lowered substrate floor;

depositing a sacrificial fill layer;

performing a chemical mechanical polishing process;

removing the sacrificial fill layer; and depositing a magnetic material to from a wrap around trailing shield.

2. The method as in claim 1 wherein the hard mask layer comprises diamond like carbon (DLC).

3. The method as in claim 1 wherein the non-magnetic side gap layer comprises alumina.

4. The method as in claim 1 wherein the hard mask layer comprises diamond like carbon (DLC) and the side gap layer comprises alumina.

5. The method as in claim 1 wherein the depositing a non-magnetic side gap layer comprises depositing alumina by atomic layer deposition.

6. The method as in claim 1 wherein the depositing a non-magnetic side gap layer comprises depositing alumina by chemical vapor deposition.

7. The method as in claim 1 wherein the sacrificial fill layer comprises $SiO_2$.

8. The method as in claim 1 wherein the sacrificial fill layer comprises SiON.

9. The method as in claim 1 wherein the sacrificial fill layer comprises SiON and wherein the removing the sacrificial fill layer comprise reactive ion etching.

10. The method as in claim 1 wherein the sacrificial fill layer comprises $SiO_2$ and the removing the sacrificial fill layer comprises reactive ion etching in an atmosphere containing $CF_4$.

11. The method as in claim 1 wherein the depositing a magnetic material to form a wrap around trailing shield comprises electroplating.

12. The method as in claim 1 wherein the second ion milling is performed after depositing the non-magnetic side gap material layer.

13. The method as in claim 1 wherein the second ion milling is performed prior to depositing the non-magnetic side gap material layer.

14. A method for manufacturing a magnetic write head for perpendicular magnetic recording, comprising:

providing a substrate;

depositing a magnetic write pole material over the substrate;

forming a mask structure over the magnetic write pool material, the mask structure including a hard mask layer comprising a material that is resistant to chemical mechanical polishing formed over the magnetic write pole material;

performing a first ion milling to define a write pole;

depositing a fist non-magnetic gap layer;

performing a second ion milling sufficiently to remove a portion of the substrate material resulting in a lower substrate floor;

depositing a sacrificial fill layer;

performing a chemical mechanical polishing process;

removing the sacrificial fill layer;

depositing the hard mask layer;

depositing a second non-magnetic gap layer, the second non-magnetic gap layer comprising an electrically conductive material; and depositing a magnetic material to from a wrap around trailing shield.

15. The method as in claim 14 wherein the hard mask comprises diamond like carbon.

16. The method as in claim 14 wherein the first non-magnetic gap layer comprises alumina.

17. The method as in claim 14 wherein the second non-magnetic gap layer comprises Rh.

18. The method as in claim 14 wherein the second non-magnetic gap layer comprises Ta.

19. The method as in claim 14 wherein the first non-magnetic gap layer comprises alumina and the second non-magnetic gap layer comprises Rh.

20. The method as in claim 14 wherein the first non-magnetic gap layer comprises alumina and the second non-magnetic gap layer comprises Ta.

21. The method as in claim 14 wherein the first non-magnetic gap comprises alumina, the second non-magnetic gap layer comprises Rh and the sacrificial fill layer comprises $SiO_2$.

22. The method as in claim 14 wherein the first non-magnetic gap layer comprises alumina, the second non-magnetic gap layer comprises Ta and the sacrificial fill layer comprises SiON.

23. The method as in claim 14 wherein the first non-magnetic gap layer comprises alumina, the second non-magnetic gap layer comprises Rh and the sacrificial fill layer comprises SiON.

* * * * *

UNITED STATES PATENT AND TRADEMARK OFFICE
CERTIFICATE OF CORRECTION

PATENT NO. : 7,467,461 B2  Page 1 of 1
APPLICATION NO. : 11/688310
DATED : December 23, 2008
INVENTOR(S) : Bonhote et al.

It is certified that error appears in the above-identified patent and that said Letters Patent is hereby corrected as shown below:

In claim 1, column 8, line 66, replace "write pool" with --write pole--.

In claim 14, column 10, line 3, replace "write pool" with --write pole--.

In claim 14, column 10, line 9, replace "fist" with --first--.

In claim 14, column 10, line 16, replace "depositing the hard" with --removing the hard--.

Signed and Sealed this

Eighth Day of June, 2010

David J. Kappos
*Director of the United States Patent and Trademark Office*